United States Patent
Tsuchiya

(10) Patent No.: US 10,189,365 B2
(45) Date of Patent: Jan. 29, 2019

(54) CHARGING CONTROL SYSTEM

(71) Applicant: TOYOTA JIDOSHA KABUSHIKI KAISHA, Toyota-shi, Aichi-ken (JP)

(72) Inventor: Yoshiyuki Tsuchiya, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/224,965

(22) Filed: Aug. 1, 2016

(65) Prior Publication Data
US 2017/0036557 A1 Feb. 9, 2017

(30) Foreign Application Priority Data

Aug. 7, 2015 (JP) .................................. 2015-157356

(51) Int. Cl.
| | |
|---|---|
| B60L 11/18 | (2006.01) |
| H02J 7/00 | (2006.01) |
| H02J 3/14 | (2006.01) |
| H02J 13/00 | (2006.01) |
| H02J 7/02 | (2016.01) |

(52) U.S. Cl.
CPC ............. B60L 11/1838 (2013.01); H02J 3/14 (2013.01); H02J 7/007 (2013.01); H02J 13/0075 (2013.01); H02J 7/02 (2013.01); H02J 2003/143 (2013.01); Y02T 90/168 (2013.01); Y04S 30/12 (2013.01)

(58) Field of Classification Search
CPC ..... B60L 11/1838; H02J 13/0075; H02J 3/14; H02J 7/007; H02J 2003/143; H02J 7/02; Y04S 30/12; Y02T 90/168

USPC ........................................................ 320/109
See application file for complete search history.

(56) References Cited

U.S. PATENT DOCUMENTS

| | | | |
|---|---|---|---|
| 2011/0022257 A1 | 1/2011 | Kumagai | |
| 2013/0088198 A1* | 4/2013 | Masuda | H02J 7/041 320/109 |
| 2013/0257387 A1* | 10/2013 | Yokoyama | H02J 7/044 320/137 |

FOREIGN PATENT DOCUMENTS

| | | |
|---|---|---|
| CN | 103647307 A | 3/2014 |
| JP | 2011-025917 A | 2/2011 |
| JP | 2011-188731 A | 9/2011 |
| JP | 2013-215084 A | 10/2013 |
| JP | 2013-233013 A | 11/2013 |

* cited by examiner

*Primary Examiner* — Edward Tso
*Assistant Examiner* — Ahmed Omar
(74) *Attorney, Agent, or Firm* — Oliff PLC

(57) ABSTRACT

A vehicle is configured to receive electric power from a residence and allow an in-vehicle electric storage device to be charged with the received electric power. A controller estimates a start time of use of the vehicle, calculates a charging start time based on the estimated start time of use of the vehicle and a required time to complete charging of the electric storage device, and provides an instruction to perform charging of the electric storage device. The controller learns a relationship between a use status of a household appliance at the residence before the start of use of the vehicle and a use status of the vehicle, and estimates the start time of use of the vehicle based on the learned relationship and the use status of the household appliance.

2 Claims, 14 Drawing Sheets

CHARGING CONTROL SYSTEM

INCORPORATION BY REFERENCE

The disclosure of Japanese Patent Application No. 2015-157356 filed on Aug. 7, 2015 including the specification, drawings and abstract is incorporated herein by reference in its entirety.

BACKGROUND

1. Technical Field

The present disclosure relates to charging control systems, and more particularly relates to a charging control system for charging an in-vehicle electric storage device from a residence by electrically connecting a vehicle to the residence.

2. Description of Related Art

Japanese Patent Application Publication No. 2013-215084 (JP 2013-215084 A) describes a charging control system for controlling charging of an electric vehicle or a plug-in hybrid vehicle. The charging control system estimates tendencies of vehicle behaviors that are dependent on charging. The vehicle behaviors include a travel distance, an ignition turned-on (IG-ON) time, a departure time, and a residence staying time (i.e., a parking duration at a residence). The estimated tendencies of the vehicle behaviors are used to set a charging schedule of the vehicle. With the charging control system, an appropriate charging schedule can automatically be set even if a user does not have sufficient understanding of the vehicle behaviors.

The charging control system described in JP 2013-215084 A has an advantage in that the charging schedule of the vehicle can automatically be set based on the learned tendencies of the vehicle behaviors.

SUMMARY

The departure time of a user may vary from day to day. When the departure time of the user varies, the accuracy of the charging schedule may be reduced. For example, when the departure time of the user is moved up, charging may not be completed by the time when the user starts to use the vehicle.

The present disclosure provides a charging control system capable of enhancing the accuracy in estimating a start time of use of a vehicle.

An example aspect of the present disclosure provides a charging control system includes a vehicle and a controller. The vehicle is configured to receive electric power from a residence and allow an in-vehicle electric storage device to be charged with the received electric power. The controller is configured to: learn a relationship between a use status of an electric appliance at the residence before a start of use of the vehicle and a use status of the vehicle; estimate a start time of use of the vehicle based on the learned relationship and the use status of the electric appliance; and calculate a charging start time based on the estimated start time of use of the vehicle and a required time to complete charging of the electric storage device, and provide an instruction to perform charging of the electric storage device.

With the configuration, the use status of the electric appliance before the start of use of the vehicle is learned by learning the relationship between the use status of the electric appliance at the residence before the start of use of the vehicle and the use status of the vehicle. The start time of use of the vehicle is estimated based on the result of learning (i.e., the learned relationship) and the use status of the electric appliance. Therefore, according to the present disclosure, even when the departure time of the user varies, the start time of use of the vehicle can be estimated accurately based on the use status of the electric appliance before departure. As a result, charging can be highly reliably completed by the departure time of the user.

The charging control system may further include a monitoring device configured to monitor the use status of the electric appliance and the use status of the vehicle. The controller may be configured to: identify the electric appliance correlated with the start of use of the vehicle based on the use status of the electric appliance monitored by the monitoring device and the use status of the vehicle; learn a relationship between a use status of the identified electric appliance and the use status of the vehicle; and estimate the start time of use of the vehicle based on the learned relationship and the use status of the identified electric appliance.

With the configuration, the use status of the electric appliance at the residence and the use status of the vehicle are monitored by the monitoring device, and the electric appliance correlated with the start of use of the vehicle is identified. Then, the relationship between the use status of the identified electric appliance and the use status of the vehicle is learned, and the use status of the identified electric appliance before start of use of the vehicle is learned. Therefore, according to the present disclosure, the start time of use of the vehicle can be estimated accurately based on the use status of the electric appliance identified to be correlated with the start of use of the vehicle.

In the charging control system, the identified electric appliance may include a timer configured to preset a use time of the identified electric appliance. The controller may be configured to estimate the start time of use of the vehicle based on the use time set in the identified electric appliance and the learned relationship.

With the configuration, the start time of use of the vehicle is estimated not based on actual use time of the identified electric appliance, but the start time of use of the vehicle is estimated based on the use time set by the timer of the identified electric appliance and the result of learning (i.e., the learned relationship). As a result, at the time of setting the timer, the charging start time can be determined based on the estimated start time of use of the vehicle. Therefore, according to the present disclosure, charging can be completed even when a time period between the use time of the identified electric appliance and the start time of use of the vehicle is shorter than the required charging time.

The charging control system may further include a monitoring device configured to monitor the use status of the vehicle. The electric appliance may be a mobile terminal used by a user of the vehicle. The controller may be configured to: learn a relationship between a wake-up time set in the mobile terminal and the use status of the vehicle; and estimate the start time of use of the vehicle based on the learned relationship and the wake-up time set in the mobile terminal.

With the configuration, the relationship between the wake-up time set in the mobile terminal used by the user and the use status of the vehicle is learned. Then, the start time of use of the vehicle is estimated based on the wake-up time set in the mobile terminal and the result of learning (i.e., the learned relationship). Therefore, according to the present disclosure, even when the departure time of the user varies, the start time of use of the vehicle can be estimated accurately based on the wake-up time set in the mobile terminal. As a result, charging can be highly reliably completed by the departure time of the user.

With the configuration, even when the departure time of the user varies, the start time of use of the vehicle can be estimated accurately based on the use status of the electric appliance at the residence before the start of use of the vehicle. As a result, charging can be highly reliably completed by the departure time of the user.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Hereinafter, example embodiments of the present disclosure will be described in detail with reference to the accompanying drawings. Although a plurality of embodiments will be described below, the configurations described in the embodiments may be combined with each other as needed. Note that identical or equivalent elements will be denoted by the same reference symbols, and description thereof will not be repeated.

First Embodiment

Figure 1:
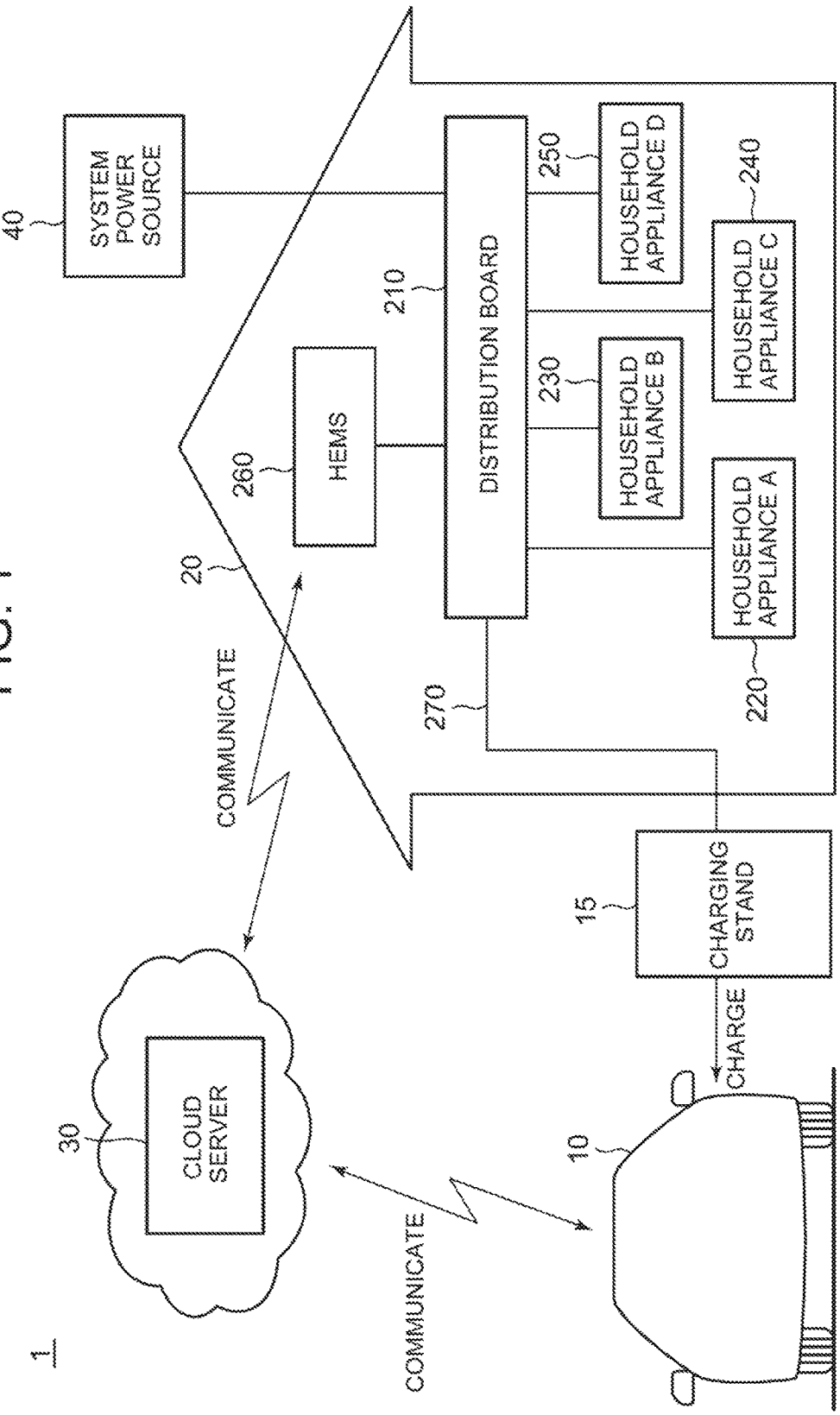
FIG. 1 is an overall configuration view of a charging control system according to a first embodiment.

FIG. 1 is an overall configuration view of a charging control system according to a first embodiment of the present disclosure. As illustrated in FIG. 1, a charging control system 1 includes a vehicle 10, a residence 20, and a cloud server 30. Note that, "residence" in this specification means a place, such as a house, in which a person lives or resides.

The vehicle 10 is configured to receive electric power from the residence 20 via a charging stand 15 and allow an in-vehicle electric storage device (not illustrated) to be charged with the received electric power. In one example, the vehicle 10 receives electric power when a charging connector is connected to an inlet of the vehicle 10. The charging connector is provided at the distal end of a charging cable extending from the charging stand 15. The vehicle 10 may receive electric power in the following manner. The vehicle 10 includes a receiving coil that receives electric power from a transmitter coil through an electromagnetic field in a non-contact manner. The transmitter coil is supplied with alternating-current (AC) power from the charging stand 15.

The vehicle 10 can communicate with a home energy management system (HEMS) 260 (described later) of the residence 20 via a power line connected to the charging stand 15 or via, for example, a wireless communication system separately provided. Thus, the HEMS 260 monitors the use status of the vehicle 10 (e.g. whether the vehicle 10 is being used at a place other than the residence 20, whether the charging cable is connected to the vehicle 10, and whether the vehicle 10 is being charged by the charging stand 15). The vehicle 10 can also communicate with the cloud server 30 via a communication system (not illustrated). When the vehicle 10 is electrically connected to the charging stand 15, charging of the in-vehicle electric storage device is performed according to a charging instruction received from the cloud server 30. The vehicle 10 is, for example, an electric vehicle that can travel using the electric power stored in the in-vehicle electric storage device. Examples of an electric include a hybrid vehicle and an electric automobile.

The residence 20 includes a distribution board 210, a household appliance A220, a household appliance B230, a household appliance C240, a household appliance D250 (hereinafter, also collectively referred to as "household appliances 220 to 250"), the HEMS 260, and a power line 270.

The distribution board 210 is a device that distributes electric power supplied from an outdoor system power source 40 to the household appliances 220 to 250 and to the vehicle 10 that is electrically connected to the power line 270 via the charging stand 15. The distribution board 210 is provided with power sensors (not illustrated) that measure electric power received from the system power source 40 and electric power to be supplied to the household appliances 220 to 250 and to the vehicle 10. Measured values of electric power are output to the HEMS 260.

The household appliances 220 to 250 are electric appliances provided at the residence 20 (the household appliances 220 to 250 may be provided indoors or outdoors), and the household appliances 220 to 250 operate using the electric power received from the system power source 40 via the distribution board 210. Examples of the household appliances 220 to 250 include cooking household appliances, such as rice cookers, television sets, and air-conditioners. Power consumption of each of the household appliances 220 to 250 is measured by the corresponding power sensor provided in the distribution board 210, and the power consumption of each of the household appliances 220 to 250 is monitored by the HEMS 260. The power consumption of each of the household appliances 220 to 250 indicates the use status of a corresponding one of the household appliances 220 to 250 used by the user. The power consumption of each of the household appliances 220 to 250 is monitored to identify a household appliance currently used by the user, as described later.

The HEMS 260 receives detection values from the power sensors provided in the distribution board 210, and monitors the power consumption of each of the household appliances 220 to 250. The HEMS 260 also monitors the use status of the vehicle 10 via the power line 270 or via, for example, the wireless communication system separately provided. The HEMS 260 collectively displays the power consumption of each of the household appliances 220 to 250 and the use status of the vehicle 10 (the use status of the vehicle 10 may include the electric power supplied to the vehicle 10 during charging of the vehicle 10). The HEMS 260 can also communicate with the cloud server 30 via the communication system (not illustrated), to continuously transmit, to the cloud server 30, for example, information about the power consumption of each of the household appliances 220 to 250 at the residence 20 (hereinafter, referred also to as "household appliance information"), and information about the use status of the vehicle 10 (hereinafter, referred also to as "vehicle information").

The cloud server 30 is configured to communicate with the HEMS 260 of the residence 20 and the vehicle 10 via, for example, the communication system (not illustrated). The cloud server 30 continuously receives the household appliance information and the vehicle information from the HEMS 260. The cloud server 30 identifies a household appliance which is correlated with the start of use of the vehicle 10 by the user, based on the received household appliance information and vehicle information. Then, the cloud server 30 learns a relationship between the use status of the identified household appliance before the start of vehicle use and the use status of the vehicle 10. The cloud server 30 further estimates a start time of use of the vehicle 10 based on the use status of the identified household appliance before the start of vehicle use, and calculates a charging start time of the vehicle 10 (i.e., a start time of charging of the vehicle 10) based on the estimated start time of use of the vehicle 10. When the calculated charging start time comes, the cloud server 30 transmits a charging start command to the vehicle 10. Processes executed by the cloud server 30 will be described later in detail.

Figure 2:
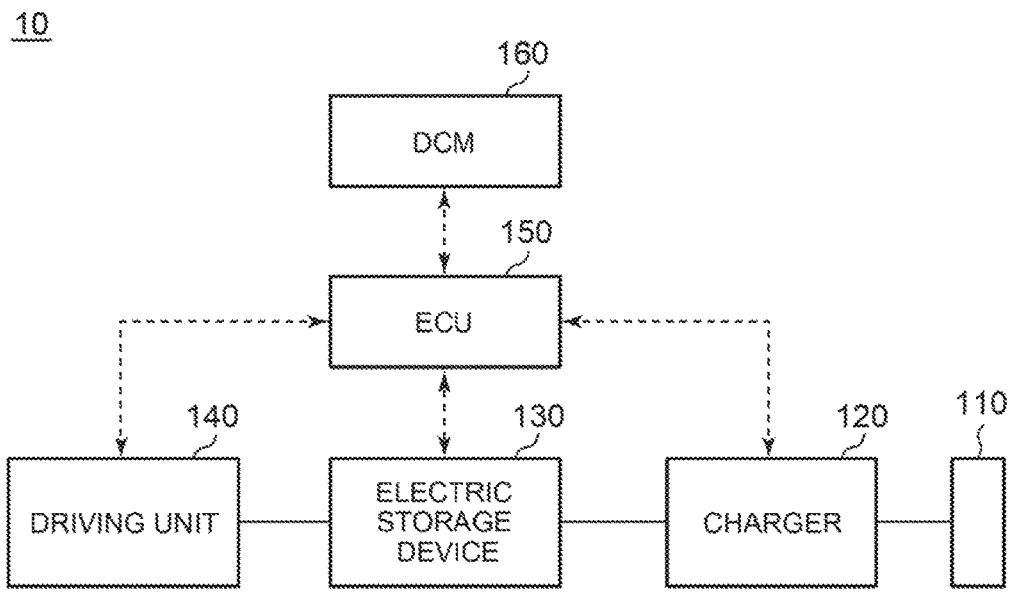
FIG. 2 is a block diagram schematically illustrating the configuration of a vehicle illustrated in FIG. 1.

FIG. 2 is a block diagram schematically illustrating the configuration of the vehicle 10 illustrated in FIG. 1. As illustrated in FIG. 2, the vehicle 10 includes a power reception unit 110, a charger 120, an electric storage device 130, a driving unit 140, an electric control unit (ECU) 150, and a data communication module (DCM) 160.

The power reception unit 110 is constituted by the inlet to which the charging connector can be connected. The charging connector is provided at the distal end of the charging cable extending from the charging stand 15 (FIG. 1). When wireless power transfer is performed using the transmitter coil electrically connected to the charging stand 15, the power reception unit 110 may be constituted by the power receiving coil that receives electric power from the transmitter coil through an electromagnetic field in a non-contact manner.

Under the control of the ECU 150, the charger 120 converts the voltage level of the electric power received from the residence 20 via the charging stand 15 into a voltage level of the electric storage device 130, and then outputs the electric power with the converted voltage level to the electric storage device 130. The charger 120 includes, for example, a rectifier and an inverter.

The electric storage device 130 can store the electric power received from the charger 120 and supply the stored electric power to the driving unit 140. The electric storage device 130 includes, for example, a secondary battery, such as a nickel-hydrogen battery or a lithium ion battery, and an electrical double layer capacitor. The electric storage device 130 can also store the electric power obtained through regenerative power generation performed in the driving unit 140 when braking is performed while the vehicle 10 is traveling.

The driving unit 140 generates driving force used to drive driving wheels (not illustrated), thereby moving the vehicle 10. Although not illustrated in particular, the driving unit 140 includes, for example, a converter and an inverter that receive supply of electric power from the electric storage device 130, and a motor that is driven by the inverter to drive the driving wheels. The driving unit 140 may include an electric power generator that generates power with which the electric storage device 130 is charged, and an engine that can drive the power generator.

The ECU 150 includes a central processing unit (CPU), a memory, and an input-output buffer (which are not illustrated), and executes various kinds of control in the vehicle 10. Typically, the ECU 150 controls the driving unit 140 to execute traveling control of the vehicle 10 when an ignition key (which may be an ignition switch) is turned on and start-up of a travel system including the driving unit 140 is requested.

When the ECU 150 receives a command for performing charging of the electric storage device 130 with use of the charging stand 15, from the cloud server 30 (FIG. 1) via the DCM 160 while the charging connector of the charging stand 15 is connected to the power reception unit 110, the ECU 150 drives the charger 120 and executes charge control for charging the electric storage device 130. Then, the ECU 150 monitors a state of charge (SOC) of the electric storage device 130, and ends the charging control when the electric storage device 130 is fully charged.

The DCM 160 is a communication device that can wirelessly communicate with the cloud server 30 (FIG. 1). The DCM 160 can exchange various kinds of information with the cloud server 30. In the first embodiment, upon reception of a charging instruction to charge the electric storage device 130 from the cloud server 30, the DCM 160 notifies the ECU 150 of the charging instruction.

Figure 3:
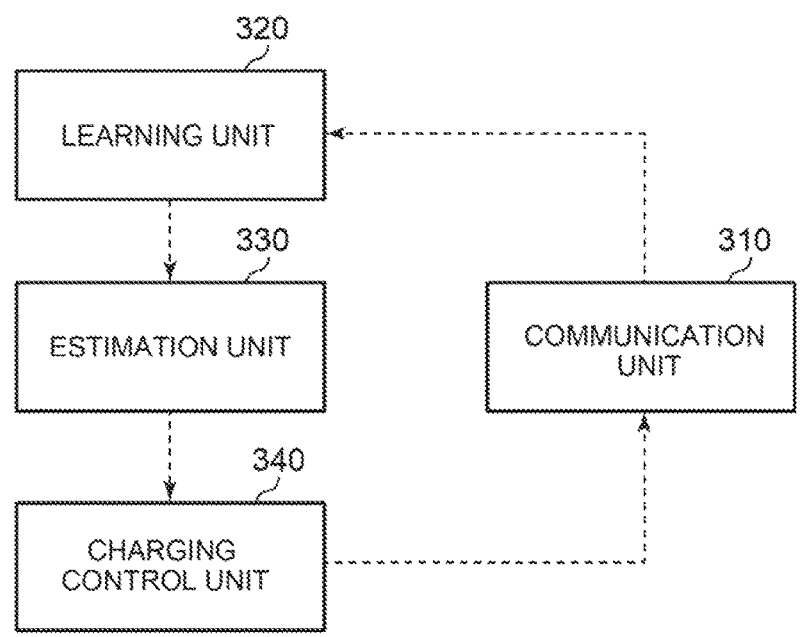
FIG. 3 is a functional block diagram of a cloud server illustrated in FIG. 1.

FIG. 3 is a functional block diagram of the cloud server 30 illustrated in FIG. 1. As illustrated in FIG. 3, the cloud server 30 includes a communication unit 310, a learning unit 320, an estimation unit 330, and a charging control unit 340. The communication unit 310 receives the household appliance information transmitted from the HEMS 260 and vehicle information. The communication unit 310 transmits, to the vehicle 10, a charging instruction to charge the vehicle 10. The charging instruction is generated by the charging control unit 340.

The learning unit 320 identifies a household appliance correlated with the start of use of the vehicle 10 by the user, based on the household appliance information received from the HEMS 260 via the communication unit 310 and the vehicle information, and the learning unit 320 learns the relationship between the use status of the identified household appliance before start of vehicle use and the use status of the vehicle 10. More specifically, the learning unit 320 recognizes a behavioral pattern of the user (a use pattern of the household appliances) before departure of the user, based on the household appliance information and the vehicle information, and the learning unit 320 identifies a household appliance that is quite often used by the user before the departure. The learning unit 320 then learns the relationship between the start of use of the identified household appliance before the start of use of the vehicle 10 and the start of use of the vehicle 10 by the user (for example, a time period between the start of use of the identified household appliance and the start of use of the vehicle 10). The use of each household appliance may be determined based on the power consumption of the household appliance. The power consumption of the household appliance is indicated by the household appliance information received from the HEMS 260.

The estimation unit 330 estimates the start time of use of the vehicle 10 based on the use status of the identified household appliance before the start of use of the vehicle 10. More specifically, when the identified household appliance is used before the start of use of the vehicle 10, the estimation unit 330 determines that the vehicle 10 will be used after a predetermined time period (result of learning), and the estimation unit 330 estimates the start time of use of the vehicle 10 based on the use time of the identified household appliance.

The charging control unit 340 calculates the charging start time of the vehicle 10 based on the start time of use of the vehicle 10 estimated by the estimation unit 330. In one example, the charging control unit 340 acquires, from the vehicle 10 via the communication unit 310, the SOC of the electric storage device 130 of the vehicle 10 and information about a charging rate by the charger 120, and the charging control unit 340 estimates a required charging time that is a period of time required to complete charging of the electric storage device 130. Then, the charging control unit 340 can set the charging start time to a time that is earlier, by the required charging time (and a margin, as necessary), than the start time of use of the vehicle 10 estimated by the estimation unit 330. The charging control unit 340 then transmits a charging instruction to charge the vehicle 10 to the vehicle 10 via the communication unit 310, when the calculated charging start time comes.

Figure 4:
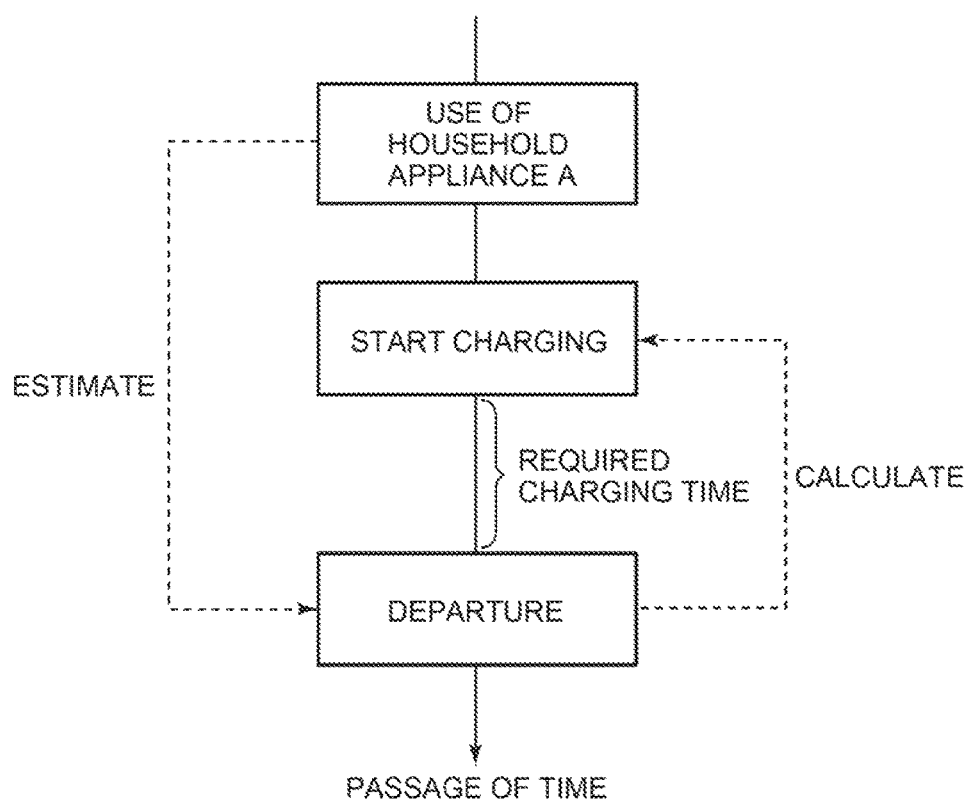
FIG. 4 is a diagram illustrating one example of a time-series of events that takes place before departure (start of use) of the vehicle.

FIG. 4 is a diagram illustrating one example of a time-series of events that takes place before departure (start of use) of the vehicle 10. As illustrated in FIG. 4, the household appliance A220 (FIG. 1) is identified as a household appliance correlated with the departure (start of use) of the vehicle 10, based on the household appliance information and the vehicle information. Then, the relationship between the start of use of the household appliance A220 before the start of use of the vehicle 10 and the departure (start of use) of the vehicle 10 (for example, a time period between the start of use of the household appliance A and the departure of the vehicle 10) is learned based on the household appliance information and the vehicle information which are collected every day.

The charging connector of the charging stand 15 is connected to the power reception unit 110 of the vehicle 10 before the use of the household appliance A220 (for example, when the user comes home). When the household appliance A220 is used at the residence 20, the departure time (start time of use) of the vehicle 10 is estimated based on the use time of the household appliance A220 and the result of learning. Furthermore, the charging start time of the electric storage device 130 (i.e., the start time of charging of the electric storage device 130) is calculated based on the estimated departure time (start time of use of the vehicle 10) and the required charging time that is the charging time required to complete charging of the electric storage device 130 (a margin may be set as necessary). When the calculated charging start time comes, a charging instruction is sent to the vehicle 10, and charging of the electric storage device 130 is started in the vehicle 10.

Figure 5:
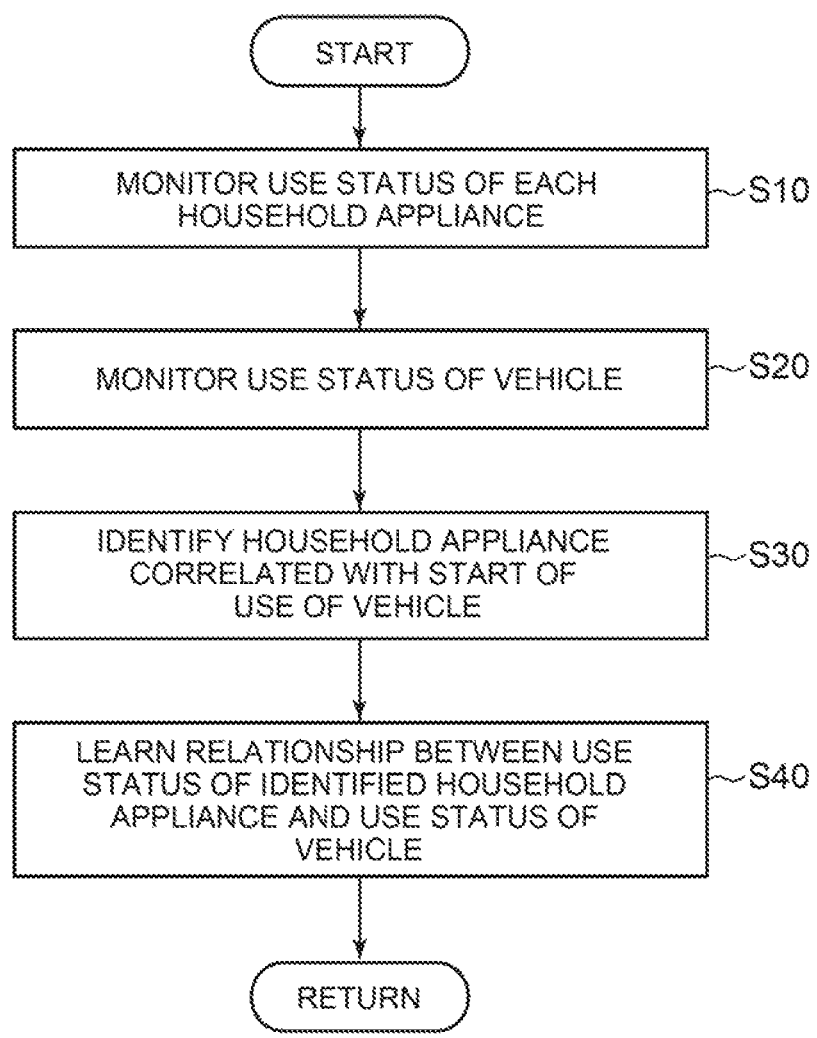
FIG. 5 is a flowchart illustrating procedures of a learning process executed by the cloud server.

FIG. 5 is a flowchart illustrating procedures of a learning process executed by the cloud server 30. As illustrated in FIG. 5, the HEMS 260 of the residence 20 monitors the use status (power consumption) of each of the household appliances 220 to 250 of the residence 20 (step S10). The monitoring result is transmitted, as the household appliance information, from the HEMS 260 to the cloud server 30.

The HEMS 260 of the residence 20 monitors the use status of the vehicle 10 (e.g. whether the vehicle 10 is being used at a place other than the residence 20, whether the charging cable is connected to the vehicle 10, and whether the vehicle 10 is being charged by the charging stand 15) (step S20). The monitoring result is transmitted, as the vehicle information on the vehicle 10, from the HEMS 260 to the cloud server 30.

The cloud server 30 continuously receives, from the HEMS 260, the household appliance information including the monitoring result of the use status of each of the household appliances 220 to 250, and the vehicle information including the monitoring result of the use status of the vehicle 10. The cloud server 30 then identifies a household appliance that is correlated with the start of use of the vehicle 10 before the start of use of the vehicle 10 by the user, based on the received household appliance information and vehicle information (step S30).

Next, the cloud server 30 learns the relationship between the use status of the household appliance identified in step S30 (the start of use of the identified household appliance before the start of use of the vehicle 10) and the use status (start of use) of the vehicle 10 by the user (step S40). Specifically, the cloud server 30 learns a time period between the start of use of the household appliance identified in step S30 and the start of use of the vehicle 10 every day. By using the result of learning, the start time of use (departure time) of the vehicle 10 can be estimated accurately.

Figure 6:
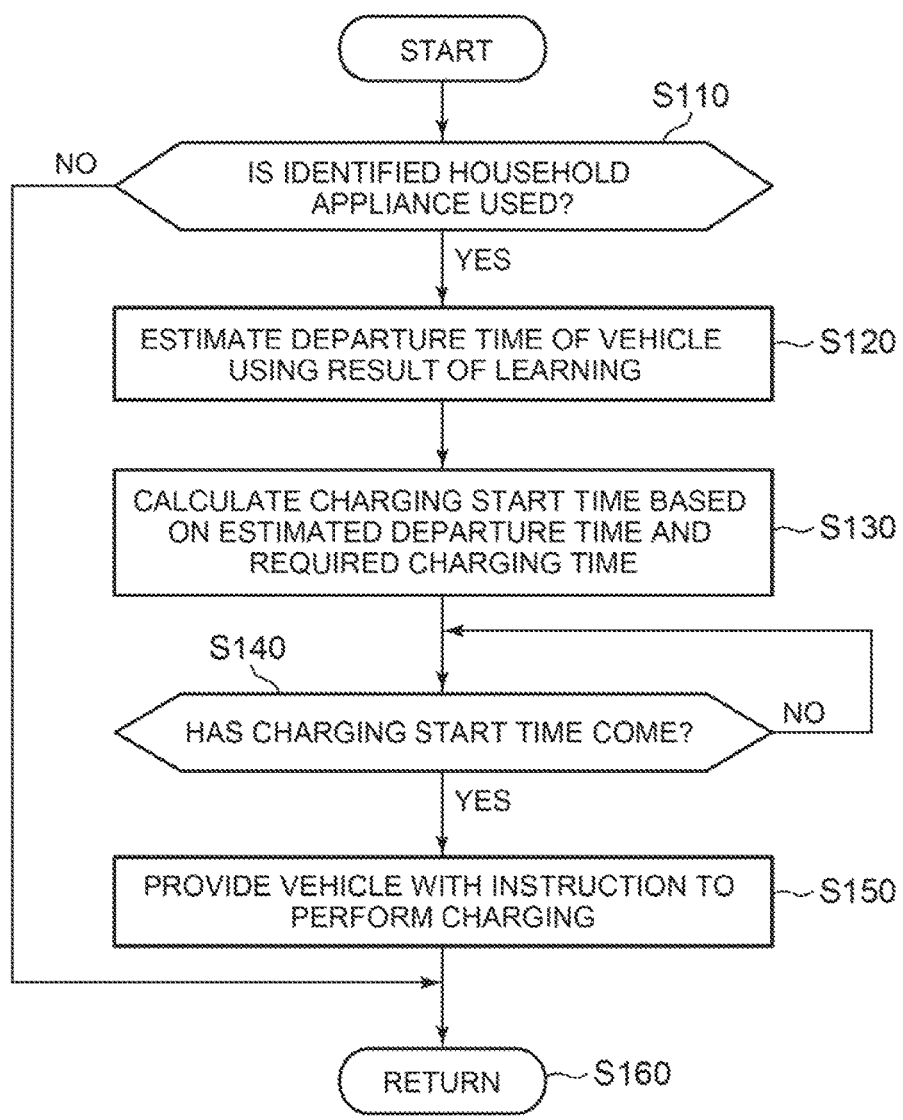
FIG. 6 is a flowchart illustrating procedures of a charging start process executed by the cloud server.

FIG. 6 is a flowchart illustrating procedures of a charging start process executed by the cloud server 30. As illustrated in FIG. 6, the cloud server 30 determines whether or not the household appliance identified as the household appliance correlated with the start of use of the vehicle 10 (step S30 in FIG. 5) is used (step S110). When the identified household appliance is not used (No in step S110), the cloud server 30 proceeds to step S160 without executing a series of subsequent processes.

When the cloud server 30 determines in step S110 that the use of the identified household appliance is started (YES in step S110), the cloud server 30 estimates the departure time (start time of use) of the vehicle 10 based on the time when the use of the identified household appliance is started and the result of learning in the learning process illustrated in FIG. 5 (the time period between the start of the use of the identified household appliance and the start of use of the vehicle 10) (step S120).

Next, the cloud server 30 sets the charging start time to a time that is earlier, by the required charging time (and a margin, as necessary), than the estimated departure time (start time of use) of the vehicle 10 (step S130). The required charging time can be calculated based on, for example, the SOC of the electric storage device 130 of the vehicle 10 and the information about the charging rate by the charger 120, which are acquired from the vehicle 10.

When the cloud server 30 determines that the charging start time calculated in step S130 comes (YES in step S140), the cloud server 30 provides the vehicle 10 with an instruction to perform charging of the electric storage device 130 in the vehicle 10 (step S150). As a result, charging of the electric storage device 130 in the vehicle 10 is performed by the charging stand 15.

As described above, in the first embodiment, the HEMS 260 monitors the use status of each of the household appliances 220 to 250 at the residence 20 and the use status of the vehicle 10, and identifies a household appliance correlated with the start of use of the vehicle 10. The relationship between the use status of the identified household appliance before the start of use of the vehicle 10 and the use status of the vehicle 10 is learned, and the use status of the identified household appliance before the start of use of the vehicle 10 is learned. Therefore, according to the first embodiment, the start time of use of the vehicle 10 can be estimated accurately based on the use status of the household appliance identified to be correlated with the start of use of the vehicle 10.

Modified Example

In the first embodiment, a single household appliance (for example, the household appliance A220) is identified as a household appliance correlated with the departure (start of use) of the vehicle 10. When the identified household appliance is used, the start time of use of the vehicle 10 is estimated using the result of learning. In order to further enhance the accuracy in estimating the start time of use of the vehicle 10, the start time of use of the vehicle 10 may be estimated when a plurality of household appliances are successively used.

Figure 7:
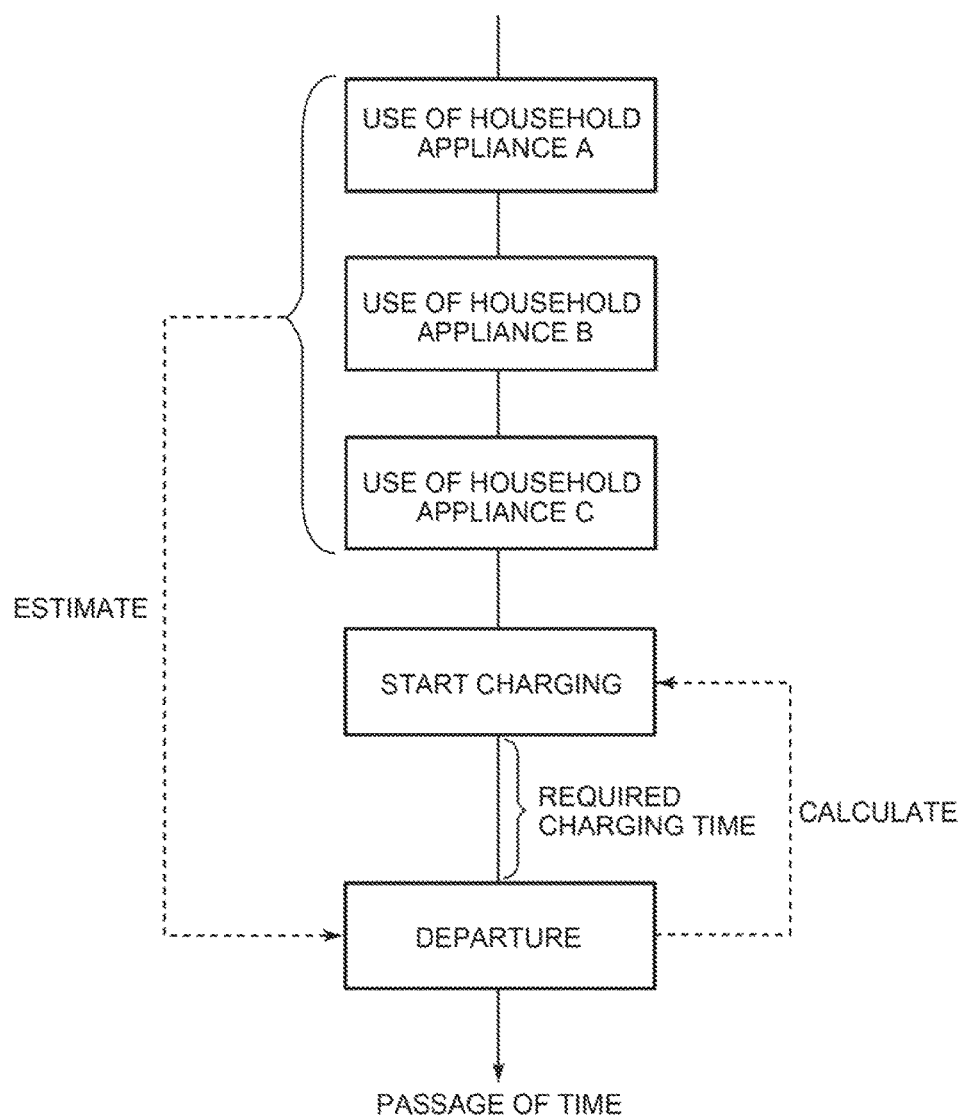
FIG. 7 is a diagram illustrating one example of a time-series of events that takes place before departure (start of use) of the vehicle in a modified example.

FIG. 7 is a diagram illustrating one example of a time-series of events that takes place before departure (start of use) of the vehicle 10 in this modified example. As illustrated in FIG. 7, a plurality of household appliances A220, B230, C240 that are successively used are identified as household appliances correlated with the departure (start of use) of the vehicle 10, based on the household appliance information and the vehicle information. Then, based on the household appliance information and the vehicle information that are collected every day, a relationship between the successive use of the household appliances A220, B230, C240 and the departure (start of use) of the vehicle 10 (for example, a time period after the household appliances A220, B230, C240 are successively in a prescribed time until the departure of the vehicle 10) is learned.

The charging connector of the charging stand 15 is connected to the power reception unit 110 of the vehicle 10 before the household appliances A220, B230, C240 are successively used (for example, when the user comes home). When the household appliances A220, B230, C240 are successively used at the residence 20, the departure time (start time of use) of the vehicle 10 is estimated based on the use time of the household appliances (basically the use time of the household appliance C240 that is used last) and the result of learning. Further, the charging start time of the electric storage device 130 is calculated based on the estimated departure time (start time of use of the vehicle 10) and the required charging time that is the charging time required to complete charging of the electric storage device 130 (a margin may be set as necessary). When the calculated charging start time comes, a charging instruction is sent to the vehicle 10, and charging of the electric storage device 130 is started in the vehicle 10.

The flows of the learning process and the charging start process in this modified example are basically the same as those in the flowcharts illustrated in FIGS. 5 and 6, and, therefore, the description thereof will not be repeated.

In an additional modified example may be employed. In the additional modified example, it is determined that there is no possibility of use of the vehicle 10 when a certain household appliance is used, and charging of the electric storage device 130 of the vehicle 10 by the charging stand 15 is not performed.

Figure 8:
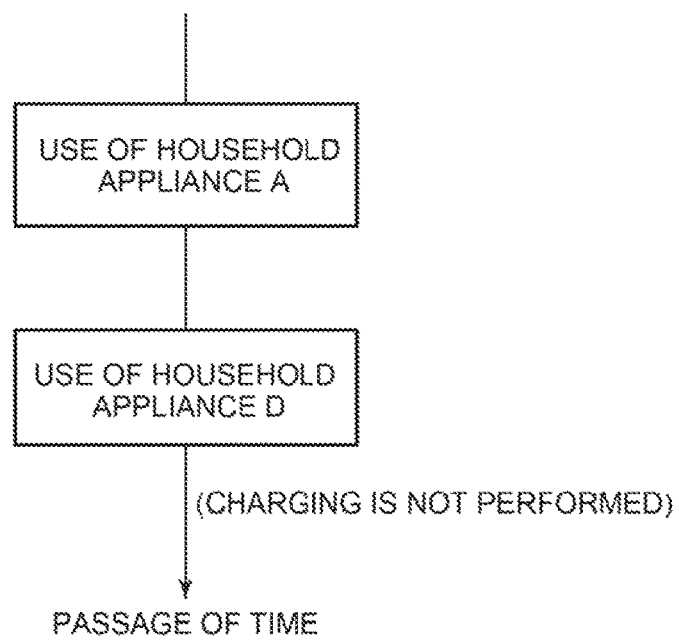
FIG. 8 is a diagram illustrating one example of a time-series of events that takes place when it is determined that there is no possibility of vehicle use.

FIG. 8 is a diagram illustrating one example of a time-series of events that takes place when it is determined that there is no possibility of use of the vehicle 10. As illustrated in FIG. 8, the household appliance A220 is identified as a household appliance correlated with the departure (start of use) of the vehicle 10, based on the household appliance information and the vehicle information. Meanwhile, based on the household appliance information and the vehicle information, the household appliance D250 is learned as a household appliance correlated with the non-use of the vehicle 10.

Although the household appliance A220 is used at the residence 20, the household appliance D250 is used after the household appliance A220 is used. As a result, it is determined that there is no possibility of use of the vehicle 10, so that charging of the electric storage device 130 by the charging stand 15 is not performed.

According to these modified examples, the accuracy in estimating the start time of use of the vehicle 10 (including cancelling the charging of the vehicle 10 when there is no possibility of use of the vehicle 10) can be further enhanced by using the use status of a plurality of household appliances.

Second Embodiment

In the first embodiment, when the household appliance (the household appliance A220) identified as a household appliance correlated with the departure (start of use) of the vehicle 10 is used, the departure time (start time of use) of the vehicle 10 is estimated based on the use time of the household appliance A220 and the result of learning. In this case, when a time period between the use time of the household appliance A220 and the departure time of the vehicle 10, the time period being the result of learning, is shorter than the required charging time, sufficient charging time for charging the electric storage device 130 cannot be secured.

In the second embodiment, the household appliance A220 used for estimation of the departure time (start time of use) of the vehicle 10 has a timer. When the use time of the household appliance A220 is preset by the timer, the departure time (start time of use) of the vehicle 10 is estimated based on the use time of the household appliance A220 set by the timer and the result of learning. As a result, the charging start time that is before the actual use time of the household appliance A220 can be estimated. Thus, even when the time period between the use time of the household appliance A220 and the departure time is shorter than the required charging time, the sufficient charging time for charging the electric storage device 130 can be secured.

Figure 9:
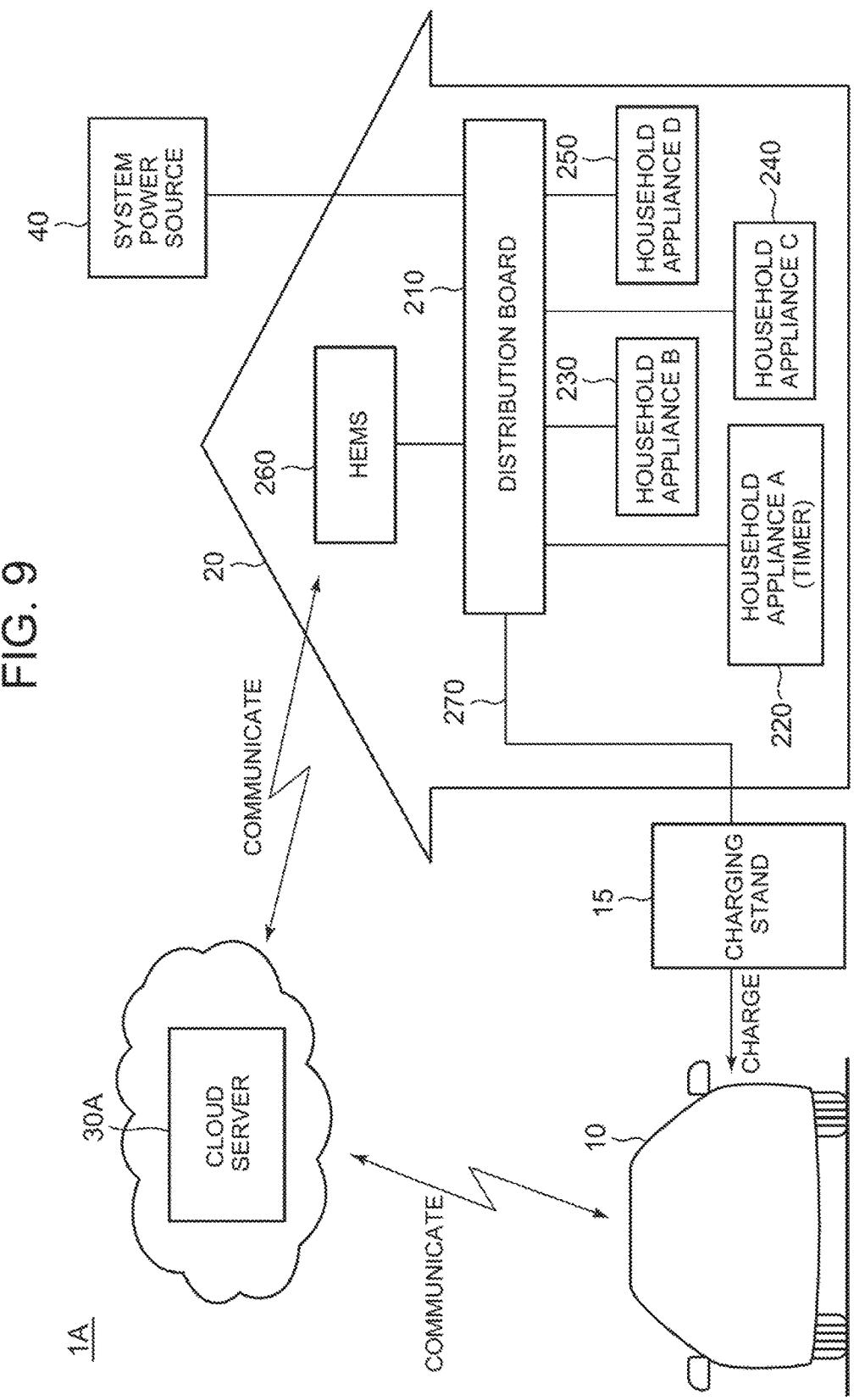
FIG. 9 is an overall configuration view of a charging control system according to a second embodiment.

FIG. 9 is an overall configuration view of a charging control system according to the second embodiment. As illustrated in FIG. 9, a charging control system 1A has the same configuration as that of the charging control system 1 according to the first embodiment illustrated in FIG. 1, except that the household appliance A220 at the residence 20 has a timer and a cloud server 30A is used instead of the cloud server 30.

The household appliance A220 has the timer by which the use time of the household appliance A220 can be set, so that the household appliance A220 is configured to start its operation when the use time set by the timer comes. The HEMS 260 continuously transmits the household appliances information and the vehicle information to the cloud server 30A. Further, when the timer is set in the household appliance A220, the HEMS 260 also transmits information about timer setting to the cloud server 30A.

The cloud server 30A identifies a household appliance (hereinafter referred to as "household appliance A220") correlated with the start of use of the vehicle 10 by the user, based on the household appliance information and the vehicle information received from the HEMS 260, and the cloud server 30A learns the relationship between the use status of the identified household appliance A220 and the use status of the vehicle 10. The cloud server 30A also estimates the start time of use of the vehicle 10 based on the use status of the identified household appliance A220, and calculates the charging start time of the vehicle 10 based on the estimated start time of use of the vehicle 10.

When the cloud server 30A receives the information on timer setting of the household appliance A220 from the HEMS 260, the cloud server 30A estimates the start time of use (departure time) of the vehicle 10 based on the use time of the household appliance A220 set by the timer, and calculates the charging start time based on the estimated start time of use of the vehicle 10. When the calculated charging start time comes, the cloud server 30A transmits a charging start command to the vehicle 10.

Figure 10:
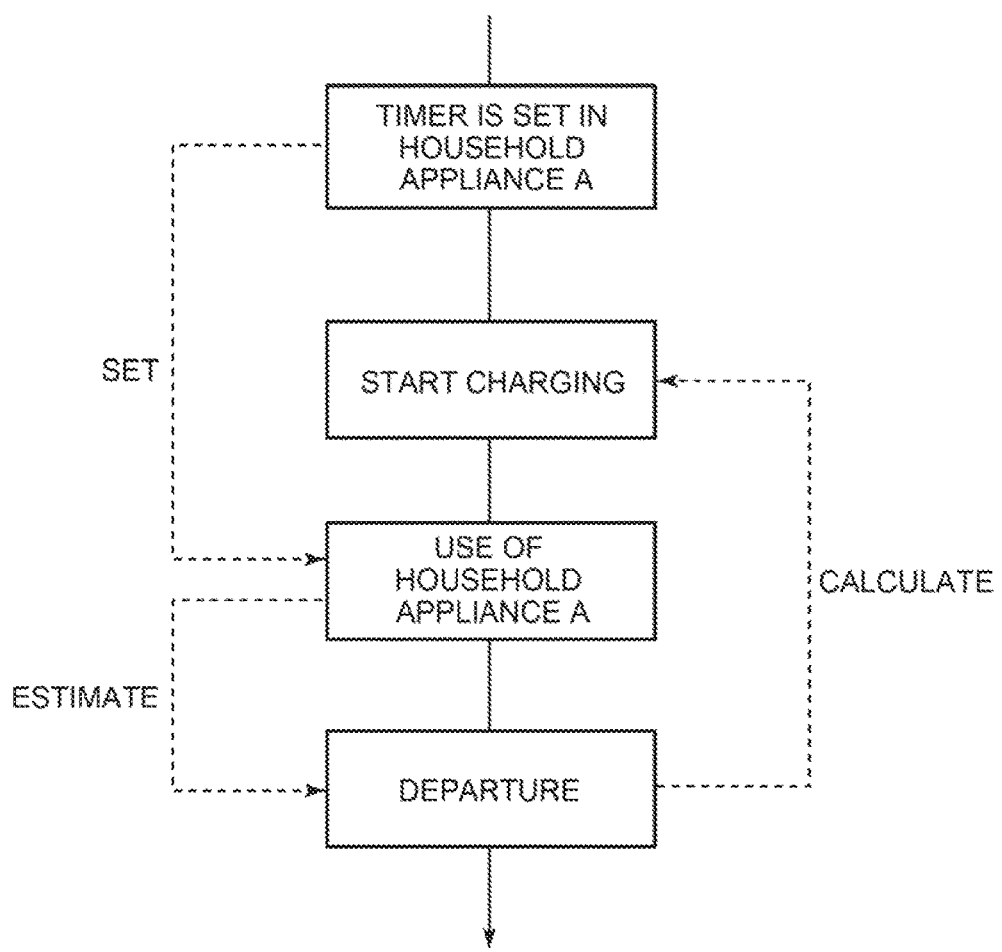
FIG. 10 is a diagram illustrating one example of a time-series of events that takes place before departure (start of use) of the vehicle in the second embodiment.

FIG. 10 is a diagram illustrating one example of a time-series of events that takes place before departure (start of use) of the vehicle 10 in the second embodiment. As illustrated in FIG. 10, the household appliance A220 is identified as a household appliance correlated with the departure (start of use) of the vehicle 10, based on the household appliance information and the vehicle information. Based on the household appliance information and vehicle information that are collected every day, the relationship between the start of use of the household appliance A220 and the departure (start of use) of the vehicle 10 is learned. The processing relating to identifying the household appliance and learning is similar to that in the first embodiment.

The charging connector of the charging stand 15 is connected to the power reception unit 110 of the vehicle 10 before use of the household appliance A220 (for example, when the user comes home). When the use time of the household appliance A220 is preset by the timer at the residence 20, the departure time (start time of use) of the vehicle 10 is estimated based on the use time set by the timer and the result of learning. Furthermore, the charging start time of the electric storage device 130 is calculated based on the estimated departure time (start time of use of the vehicle 10) and the required charging time that is the time required to complete charging of the electric storage device 130. When the calculated charging start time comes, a charging instruction is sent to the vehicle 10, and charging of the electric storage device 130 is started in the vehicle 10.

Figure 11:
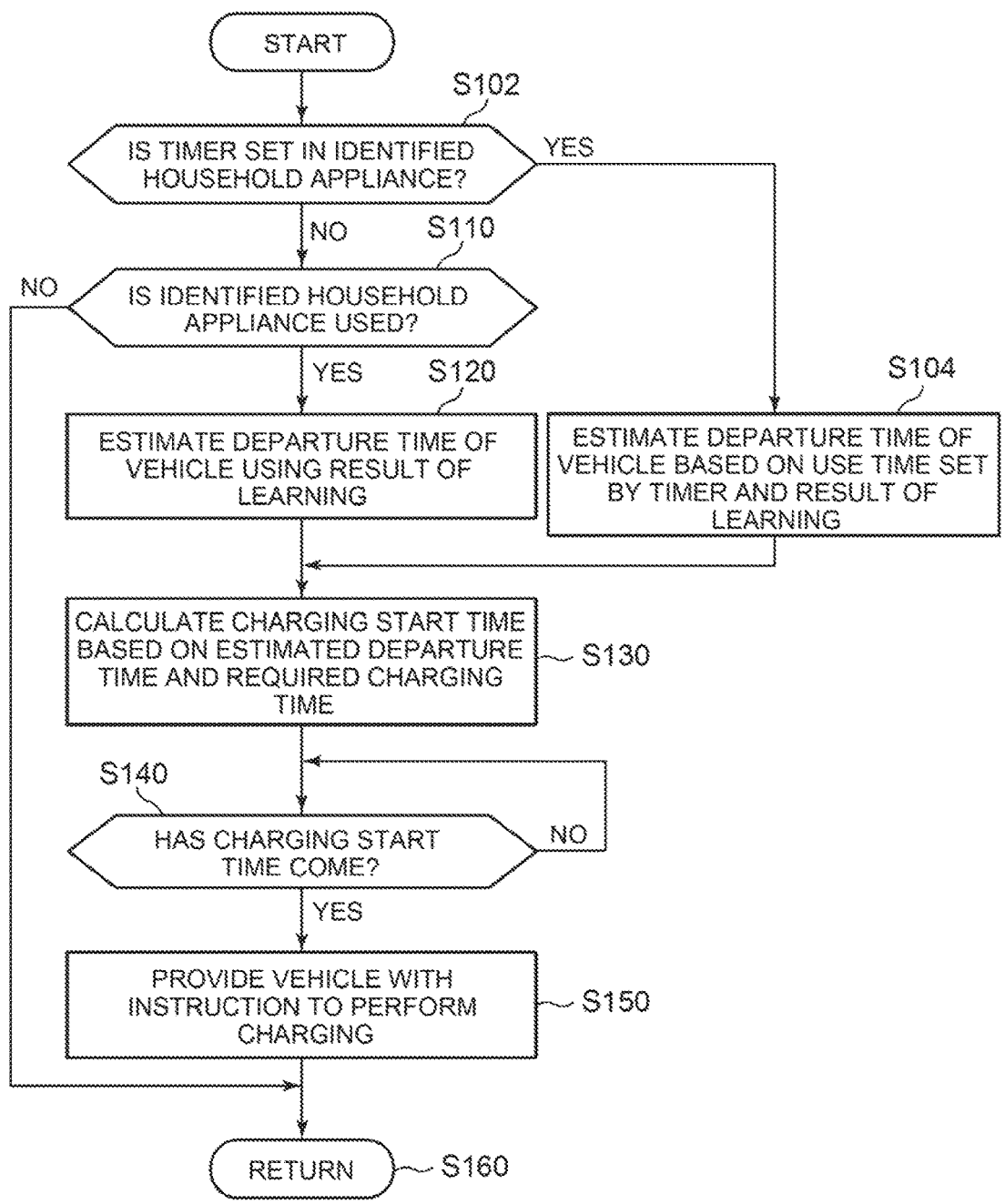
FIG. 11 is a flowchart illustrating procedures of a charging start process executed by the cloud server in the second embodiment.

FIG. 11 is a flowchart illustrating procedures of a charging start process executed by the cloud server 30A in the second embodiment. As illustrated in FIG. 11, the flowchart further includes steps S102 and S104, in addition to the steps in the flowchart in the first embodiment illustrated in FIG. 6.

More specifically, before execution of the process of step S110, the cloud server 30A determines whether or not a use time is set by a timer in a household appliance identified as a household appliance correlated with the start of use of the vehicle 10 (step S102). When the cloud server 30A determines that the use time is not set by the timer in the identified household appliance (NO in step S102), the cloud server 30A proceeds to step S110.

When the cloud server 30A determines in step S102 that the use time is set by the timer in the identified household appliance (YES in step S102), the cloud server 30A estimates the departure time (start time of use) of the vehicle 10 based on the use time set by the timer and the result of learning in the learning process (FIG. 5) (a time period between the start of use of the identified household appliance and the start of use of the vehicle 10) (step S104). Then, the cloud server 30A proceeds to step S130, where the charging start time of the vehicle 10 is calculated based on the estimated departure time (start time of use) of the vehicle 10 and the required charging time. The processes of steps S110 to S160 are as described above with reference to FIG. 6.

The procedures of the learning process executed by the cloud server 30A are the same as the procedures of the learning process in the first embodiment illustrated in FIG. 5.

As described above, in the second embodiment, the start time of use of the vehicle 10 is estimated not based on the actual use time of the household appliance identified as a household appliance correlated with the start of use of the vehicle 10, but the start time of use of the vehicle 10 is estimated based on the use time of the identified household appliance set by the timer and the result of learning. As a result, at the time of setting the timer, the charging start time can be determined based on the estimated start time of use of the vehicle 10. Therefore, according to the second embodiment, charging of the electric storage device 130 can be completed even when a time period between the use time of the identified household appliance and the start time of use of the vehicle 10 is shorter than the required charging time.

Third Embodiment

In the second embodiment, when the household appliance identified as a household appliance correlated with departure (start of use) of the vehicle 10 has a timer, the departure time (start time of use) of the vehicle 10 is estimated based on the use time set by the timer and the result of learning.

In the third embodiment, the departure time (start time of use) of the vehicle 10 is estimated using a timer (wake-up alarm setting) of a mobile terminal, such as a cellular phone. Thus, the departure time of the vehicle 10 can be accurately estimated using the mobile terminal, and the sufficient charging time of the electric storage device 130 can be secured.

Figure 12:
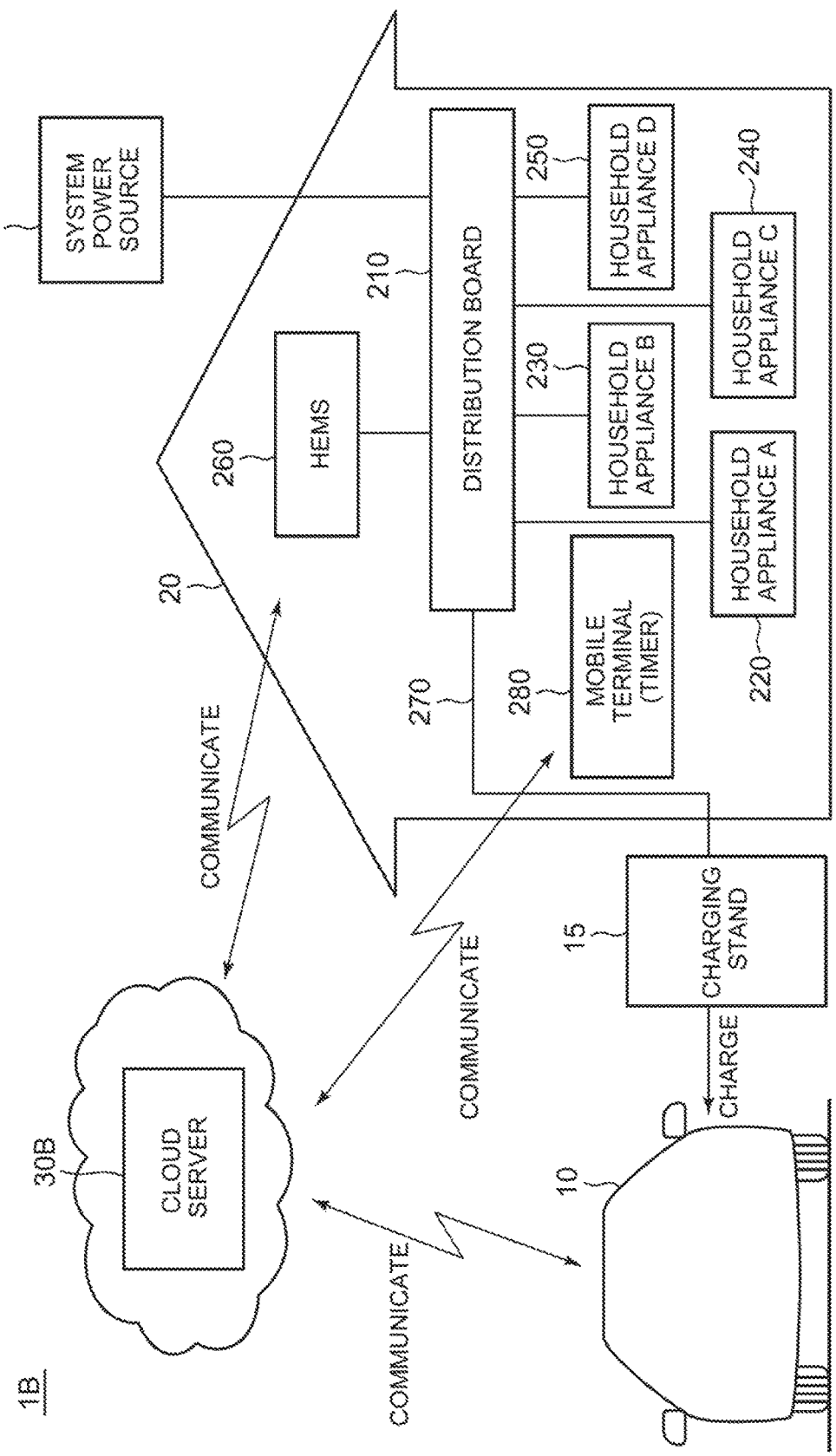
FIG. 12 is an overall configuration view of a charging control system according to a third embodiment.

FIG. 12 is an overall configuration view of a charging control system according to the third embodiment. As illustrated in FIG. 12, a charging control system 1B has the same configuration as that of the charging control system 1 according to the first embodiment illustrated in FIG. 1, except that the charging control system 1B further includes a mobile terminal 280 and a cloud server 30B is used instead of the cloud server 30.

The mobile terminal 280 is one of the electric appliances used by the user of the vehicle 10, and examples of the mobile terminal 280 include cellular phones and tablet terminals having a wireless communication function. The mobile terminal 280 has a timer, so that a wake-up time of the user can be set by the timer. When the user sets the wake-up time using the timer, the mobile terminal 280 transmits timer setting information to the cloud server 30B. The timer setting information may be transmitted to the cloud server 30 via the HEMS 260.

The cloud server 30B learns a relationship between the wake-up time of the user set by the timer and the use status of the vehicle 10, based on the timer setting information received every day from the mobile terminal 280 and the vehicle information on the vehicle 10 continuously received from the HEMS 260. The cloud server 30B then estimates the start time of use of the vehicle 10 based on the result of learning and the wake-up time set by the timer in the mobile terminal 280, and the cloud server 30B calculates the charging start time of the vehicle 10 based on the estimated start time of use of the vehicle 10. When the calculated charging start time of the vehicle 10 comes, the cloud server 30B transmits a charging start command to the vehicle 10.

Figure 13:
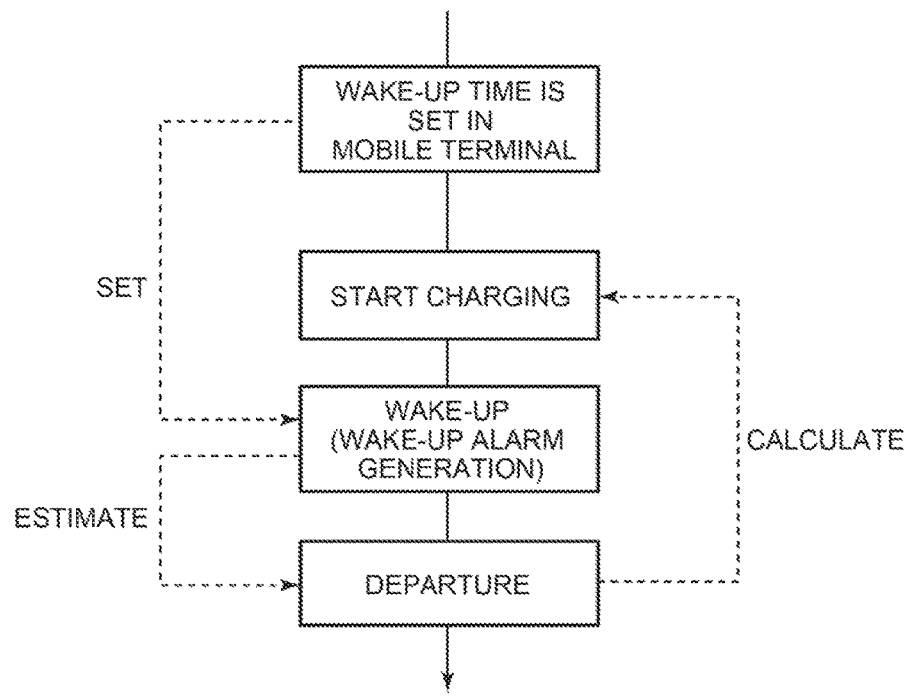
FIG. 13 is a diagram illustrating one example of a time-series of events that takes place before departure (start of use) of the vehicle in the third embodiment.

FIG. 13 is a diagram illustrating one example of a time-series of events that takes place before departure (start of use) of the vehicle 10 in the third embodiment. As illustrated in FIG. 13, the relationship between the wake-up time set by the timer and the start of use (departure) of the vehicle 10 is learned based on the daily timer setting information in the mobile terminal 280 and the vehicle information on the vehicle 10.

The charging connector of the charging stand 15 is connected to the power reception unit 110 of the vehicle 10 before start of charging of the electric storage device 130 by the charging stand 15 (for example, when the user comes home). When the wake-up time is set by the timer in the mobile terminal 280, the departure time (start time of use) of the vehicle 10 is estimated based on the set wake-up time (wake-up alarm generation time) and the result of learning. Furthermore, the charging start time of the electric storage device 130 is calculated based on the estimated departure time (start time of use of the vehicle 10) and the charging time required to complete charging of the electric storage device 130. When the calculated charging start time comes, a charging instruction is sent to the vehicle 10, and charging of the electric storage device 130 is started in the vehicle 10.

Figure 14:
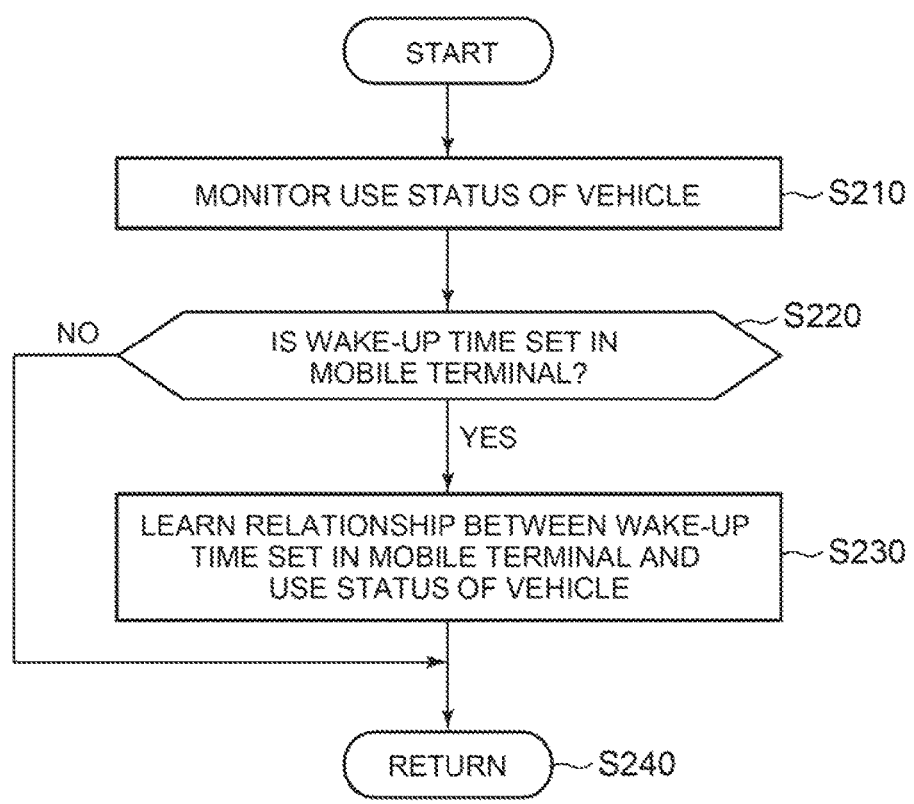
FIG. 14 is a flowchart illustrating procedures of a learning process executed by the cloud server in the third embodiment.

FIG. 14 is a flowchart illustrating procedures of a learning process executed by the cloud server 30B in the third embodiment. As illustrated in FIG. 14, the HEMS 260 of the residence 20 monitors the use status of the vehicle 10 (step S210). The monitoring result is continuously transmitted, as the vehicle information on the vehicle 10, from the HEMS 260 to the cloud server 30B.

Next, the cloud server 30B determines whether or not a wake-up time is set by the timer in the mobile terminal 280 (step S220). As described above, when the wake-up time is set by the timer in the mobile terminal 280, timer setting information is transmitted to the cloud server 30B from the mobile terminal 280. Upon reception of the timer setting information from the mobile terminal 280, the cloud server 30B determines that the wake-up time is set in the mobile terminal 280.

When the cloud server 30B determines in step S220 that the wake-up time is set in the mobile terminal 280 (YES in step S220), the cloud server 30B learns a relationship between the wake-up time set by the timer in the mobile terminal 280 and the status of use (start of use) of the vehicle 10 by the user (step S230). Specifically, the cloud server 30B learns a time period between the wake-up time set in the mobile terminal 280 and the start of use of the vehicle 10.

Figure 15:
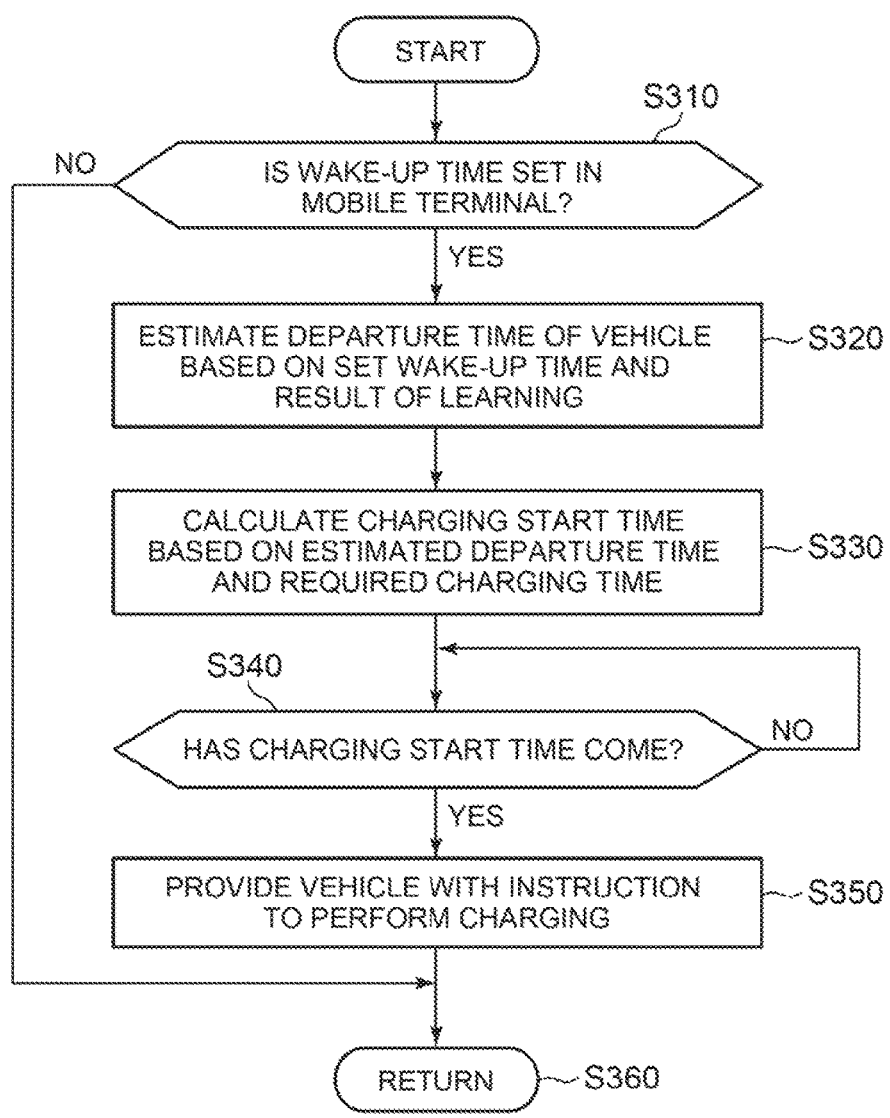
FIG. 15 is a flowchart illustrating procedures of a charging start process executed by the cloud server in the third embodiment.

FIG. 15 is a flowchart illustrating procedures of a charging start process executed by the cloud server 30B in the third embodiment. As illustrated in FIG. 15, the cloud server 30B determines whether or not the user sets the wake-up time using the timer in the mobile terminal 280 (step S310). When the cloud server 30B determines that the wake-up time is not set (NO in step S310), the cloud server 30B proceeds to step S360.

When the cloud server 30B determines in step S310 that the wake-up time is set by the timer in the mobile terminal 280 (YES in step S310), the cloud server 30B estimates the departure time (start time of use) of the vehicle 10 based on the set wake-up time and the result of learning in the learning process (FIG. 14) (a time period between the set wake-up time and the start of use of the vehicle 10) (step S320).

Then, the cloud server 30B proceeds to step S330, where the charging start time of the vehicle 10 is calculated based on the estimated departure time (start time of use) of the vehicle 10 and the required charging time. Processes of steps S330 to S350 are the same as those of steps S130 to S150 illustrated in FIG. 6, and, therefore, description thereof will not be repeated.

As described above, in the third embodiment, the relationship between the wake-up time set in the mobile terminal 280 used by the user and the use status of the vehicle 10 is learned. Then, the start time of use of the vehicle 10 is estimated based on the wake-up time set in the mobile terminal 280 and the result of learning. Thus, according to the third embodiment, even when the departure time of the user varies, the start time of use of the vehicle 10 can be estimated accurately based on the wake-up time set in the mobile terminal 280. As a result, charging can be highly reliably completed by the departure time of the user.

In each of the embodiments described above, various kinds of information are transmitted from the HEMS 260 to the cloud server 30 (30A; 30B), and the learning process and the charging start process are executed by the cloud server 30 (30A; 30B). However, these processes need not be executed by the cloud server 30 (30A; 30B). The learning process and the charging start process may be executed by the HEMS 260 or a controller separately provided in the residence 20, or may be executed by the ECU 150 of the vehicle 10.

In the above description, the cloud server 30 (30A; 30B) is one example of "controller" in the charging control system, and the HEMS 260 is one example of "monitoring device" in the charging control system. Each of the household appliances 220 to 250 and the mobile terminal 280 is one example of "electric appliance" in the charging control system.

The disclosed embodiments may be implemented in combination with each other. Thus, each of the disclosed embodiments is to be considered in all respects as illustrative and not restrictive. The technical scope of the charging control system is defined by claims and not by the description of the embodiments, and all changes which come within the meaning and range of equivalency of the claims are therefore intended to be embraced therein.

What is claimed is:

1. A charging control system comprising:
a vehicle configured to receive electric power from a residence and allow an in-vehicle electric storage device to be charged with the received electric power;
a monitoring device configured to monitor a use status of an electric appliance at the residence and a use status of the vehicle; and a controller configured to:
identify the electric appliance correlated with the start of use of the vehicle based on the use status of the electric appliance monitored by the monitoring device and the use status of the vehicle;
learn a relationship between the use status of the identified electric appliance at the residence before a start of use of the vehicle and the use status of the vehicle;
estimate a start time of use of the vehicle based on the learned relationship and the use status of the identified electric appliance; and
calculate a charging start time based on the estimated start time of use of the vehicle and a required time to complete charging of the electric storage device, and provide an instruction to perform charging of the electric storage device;
wherein
the identified electric appliance includes a timer configured to preset a use time of the identified electric appliance, and
the controller is further configured to estimate the start time of use of the vehicle based on the use time preset in the identified electric appliance and the learned relationship.

2. A charging control system comprising:
a vehicle configured to receive electric power from a residence and allow an in-vehicle electric storage device to be charged with the received electric power;
a monitoring device configured to monitor a use status of the vehicle; and
a controller configured to:
learn a relationship between a use status of an electric appliance at the residence before a start of use of the vehicle and the use status of the vehicle;
estimate a start time of use of the vehicle based on the learned relationship and the use status of the electric appliance; and
calculate a charging start time based on the estimated start time of use of the vehicle and a required time to complete charging of the electric storage device, and provide an instruction to perform charging of the electric storage device;
wherein
the electric appliance is a mobile terminal used by a user of the vehicle, and
the controller is further configured to:
learn a second relationship between a wake-up time set in the mobile terminal and the use status of the vehicle; and
estimate the start time of use of the vehicle based on the learned second relationship and the wake-up time set in the mobile terminal.

* * * * *